United States Patent
Wilson

(10) Patent No.: US 11,344,005 B2
(45) Date of Patent: May 31, 2022

(54) WALL-MOUNTED SCRATCH POST ASSEMBLY FOR CATS

(71) Applicant: Catastrophic Creations LLC, Byron Center, MI (US)

(72) Inventor: Michael Wilson, Byron Center, MI (US)

(73) Assignee: Catastrophic Creations, LLC, Byron Center, MI (US)

( * ) Notice: Subject to any disclaimer, the term of this patent is extended or adjusted under 35 U.S.C. 154(b) by 22 days.

(21) Appl. No.: 16/913,235

(22) Filed: Jun. 26, 2020

(65) Prior Publication Data

US 2021/0400914 A1    Dec. 30, 2021

(51) Int. Cl.
*A01K 15/02* (2006.01)

(52) U.S. Cl.
CPC .......... *A01K 15/024* (2013.01); *A01K 15/027* (2013.01)

(58) Field of Classification Search
CPC ... A01K 15/024; A01K 15/027; A01K 13/004
See application file for complete search history.

(56) References Cited

U.S. PATENT DOCUMENTS

| | | | | |
|---|---|---|---|---|
| 4,611,556 A | * | 9/1986 | Frank | A01K 15/024 119/706 |
| 5,067,440 A | * | 11/1991 | Hatten | A01K 15/024 119/706 |
| 10,524,452 B2 | | 1/2020 | Feldman | |
| 2013/0333629 A1 | | 12/2013 | Worldwise | |

(Continued)

FOREIGN PATENT DOCUMENTS

| | | |
|---|---|---|
| DE | 20011768 U1 | 12/2000 |
| DE | 202004018809 U | 3/2005 |
| FR | 2955738 A | 8/2011 |

OTHER PUBLICATIONS https://www.rejuvenation.com/catalog/collections/floating-shelf/products/5f08b1f4fc1ebc6ea71ee8f5?gclid= EAlalQobChMl8L-x1YPt8glVF7jlCh1U6wwAEAQYAiABEgJnYvD_BwE(Year: 2020).*

(Continued)

*Primary Examiner* — Timothy D Collins
*Assistant Examiner* — Maria E Graber
(74) *Attorney, Agent, or Firm* — Caldwell Intellectual Property Law; Keegan Caldwell

(57) ABSTRACT

A wall-mounted scratch post assembly for cats includes a mounting plate affixed to a vertical surface, the mounting plate including a wall-facing surface mounted against the vertical surface, a post-facing surface facing away from the vertical surface, a first attachment mechanism affixing the mounting plate to the vertical surface, and a second attachment mechanism attached to the post-facing surface. The assembly includes a scratch post, wherein the scratch post includes a proximal end attached to the mounting plate, wherein the proximal end includes a proximal surface formed to fit against the post-facing surface and a third attachment mechanism that attaches to the second attachment mechanism, a distal end opposite the proximal end and facing away from the vertical surface, a support structure connecting the proximal end to the distal end, and a fibrous covering coating the support structure.

20 Claims, 7 Drawing Sheets

(56) References Cited

U.S. PATENT DOCUMENTS

2015/0122198 A1 5/2015 Voronenko
2018/0103613 A1* 4/2018 Voronenko ............. A01K 15/02

OTHER PUBLICATIONS https://www.etsy.com/listing/651457135/wall-step-cat-scratcher-cat-step-sisal?ga_order=most_relevant&ga_search_type=all&ga_view_type=gallery&ga_search_query=floating+sisal+post+steps%2C+cat+scratching+post&ref=sc_gallery-1-3&plkey=bf928335917ceab8937698312a3a145758616d72%3A651457135&frs=1 (Year: 2019).*
Retrieved from: https://www.chewy.com/catastrophicreations-wall-mounted/dp/207350.
https://www.amazon.com/Scurrty-Handcrafted-Scratching-Natural-Mounted/dp/B07MZQD5M8/ref=sr_1_2?dchild=1&keywords=Floating+Cat+Post&qid=1588878120&sr=8-2.
https://myzoo.org/products/twinkle-star?lang=en.
https://www.aliexpress.com/item/4000812038297.html?aff_platform=default&sk=DKYS8X48&aff_trace_key=95125a5764fb4d8790ed4223ba881b7f-1588878324717-04149-DKYS8X48&dp=ei.arstagummicentral.se&terminal_id=9e539513a2344d49aaed333503fd515f&tmLog=new_Detail&aff_request_id=95125a5764fb4d8790ed4223ba881b7f-1588878324717-04149-AliExpress: Wall-Mounted Wooden Cat Scratching Post Kitten Climbing Sisal Tree Pet Scratch Board Toy Cat Scratcher Tower Floating Sisal Step.
https://www.catsplay.com/sisal-step-wall-mounted-scratch.
htttps://www.etsy.com/listing/707332646/floating-sisal-post-steps-cat-scratching?ref=landingpage_similar_listing_top-6&pro=1&frs=1.
https://www.athleticat.net/.
https://www.homedepot.com/p/TRIXIE-Brown-Wall-Mount-Cat-Playground-49925/306598580.

\* cited by examiner

to the field of pet furniture. In particular, the present invention is directed to a wall-mounted scratch post assembly for cats.

WALL-MOUNTED SCRATCH POST ASSEMBLY FOR CATS

FIELD OF THE INVENTION

The present invention generally relates to the field of pet furniture. In particular, the present invention is directed to a wall-mounted scratch post assembly for cats.

BACKGROUND

As many pet owners can attest, cats have a physical and psychological need both to climb upon objects and to sharpen claws on surfaces. To avoid resulting damage to furniture, householders often provide cats with play structures and scratch posts on which to exercise their instinctive proclivities. Such structures, however, can be difficult to integrate in a home, due to constraints both of space and style.

SUMMARY OF THE DISCLOSURE

In an aspect, a wall-mounted scratch post assembly for cats includes a mounting plate affixed to a vertical surface, the mounting plate including a wall-facing surface mounted against the vertical surface, a post-facing surface facing away from the vertical surface, a first attachment mechanism affixing the mounting plate to the vertical surface, and a second attachment mechanism attached to the post-facing surface. The assembly includes a scratch post, wherein the scratch post includes a proximal end attached to the mounting plate, wherein the proximal end includes a proximal surface formed to fit against the post-facing surface and a third attachment mechanism that attaches to the second attachment mechanism, a distal end opposite the proximal end and facing away from the vertical surface, a support structure connecting the proximal end to the distal end, and a fibrous covering coating the support structure.

In another aspect, a wall-mounted scratch post assembly for cats includes a mounting plate affixed to a vertical surface, the mounting plate including a wall-facing surface mounted against the vertical surface, a post-facing surface facing away from the vertical surface, a first attachment mechanism affixing the mounting plate to the vertical surface, and a threaded projection attached to the post-facing surface. The assembly includes a scratch post, wherein the scratch post includes a proximal end attached to the mounting plate, a distal end opposite the proximal end and facing away from the vertical surface, a support structure connecting the proximal end to the distal end, a fibrous covering coating the support structure, a proximal end plate at the proximal end, wherein the proximal end plate includes a proximal surface formed to fit against the post-facing surface and a reciprocally threaded hole that attaches to the threaded projection.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

Embodiments described in this disclosure include a scratch post that can be securely and easily mounted to walls. Mounting may be invisible once assembled, leading to an aesthetically pleasing appearance. Use of a separate mounting plate, which may be affixed to studs, provides users with an easy attachment process. Mounting plate and scratch post combinations described herein may also be readily removed and reattached without wear to any part, maximizing economy and customizability. Scratch post may be removed for replacement and/or repairs, followed by later reattachment. Embodiments described herein may also be structurally strong, enabling assembly to support weight of even comparatively massive cats, and to sustain repeated use without breaking.

Figure 1:
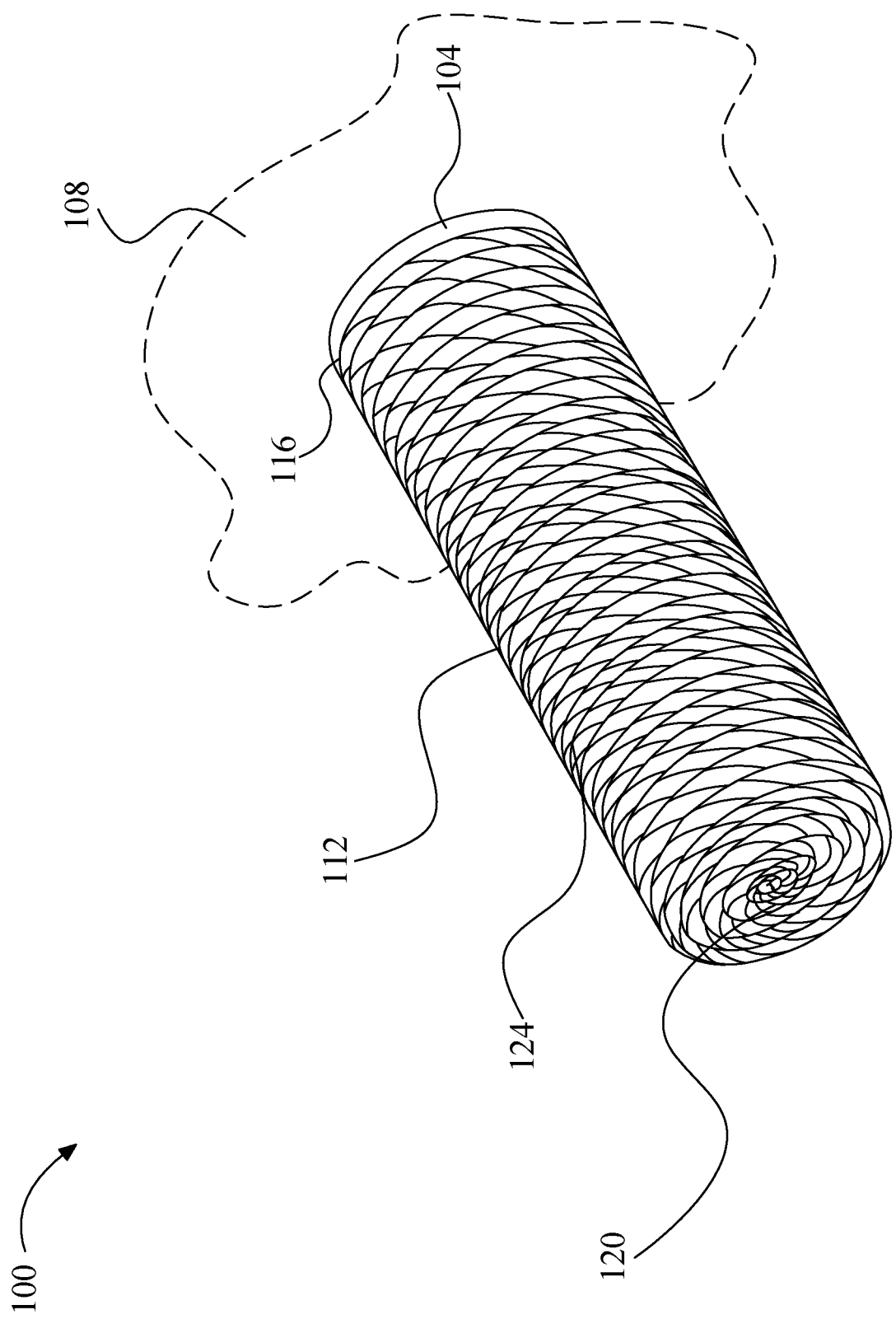
FIG. 1 is an isometric drawing of an exemplary embodiment of a wall-mounted scratch post assembly for cats.

Referring FIG. 1, an exemplary embodiment of a wall-mounted scratch post assembly 100 for cats is illustrated. Assembly 100 includes a mounting plate 104 affixed to a vertical surface 108. Assembly 100 includes a scratch post 112 including a proximal end 116 attached to the mounting plate 104 and a distal end 120 opposite the proximal end 116 and facing away from the vertical surface 108. Scratch post 112 includes a fibrous covering 124. Fibrous covering 124 may form an exterior surface of scratch post 112, upon which a cat may climb, play, rest, and/or sharpen its claws.

Still referring to FIG. 1, vertical surface 108 may include, as a non-limiting example, an interior or exterior wall, an interior or exterior door, a doorframe, a piece of molding or other architectural element of an interior or exterior of a building, a surface of an item of furniture such as a shelving unit, chair, table, or other item, a portion of a ceiling such as a substantially vertical section of a domed or Mansard roof ceiling, a substantially vertical projection from a ceiling, a rafter or cross-beam, a stand such as a "hobby horse" or other item designed to support other objects, whether specially constructed to support assembly 100 or adapted for such support. Vertical surface 108 may be substantially vertical only in the localized area to which mounting plate 104 attaches; that is, vertical surface 108 may include a surface that is vertical, or nearly vertical, only where attachment means of proximal end 116 and/or bracing means as described in further detail below attach to vertical surface 108. "Nearly vertical," as used herein, includes any surfaces that can be locally treated as essentially vertical; for instance, a surface is nearly vertical locally, and therefore substantially vertical as used herein, if the mounting slot and brace may contact the surface at points that may be located on an apparently vertical plane from a user's perspective, regardless of surface forms between those points.

With continued reference to FIG. 1, assembly 100 may be attached to vertical surface 108, permitting a cat to climb upon assembly 100, to sharpen claws thereon, and/or perform other activities, for instance and without limitation as shown. Multiple assemblies may be attached together and/or combined with other pet furniture, for instance to make more complex climbing structures for use and entertainment by cats.

Figure 2A:
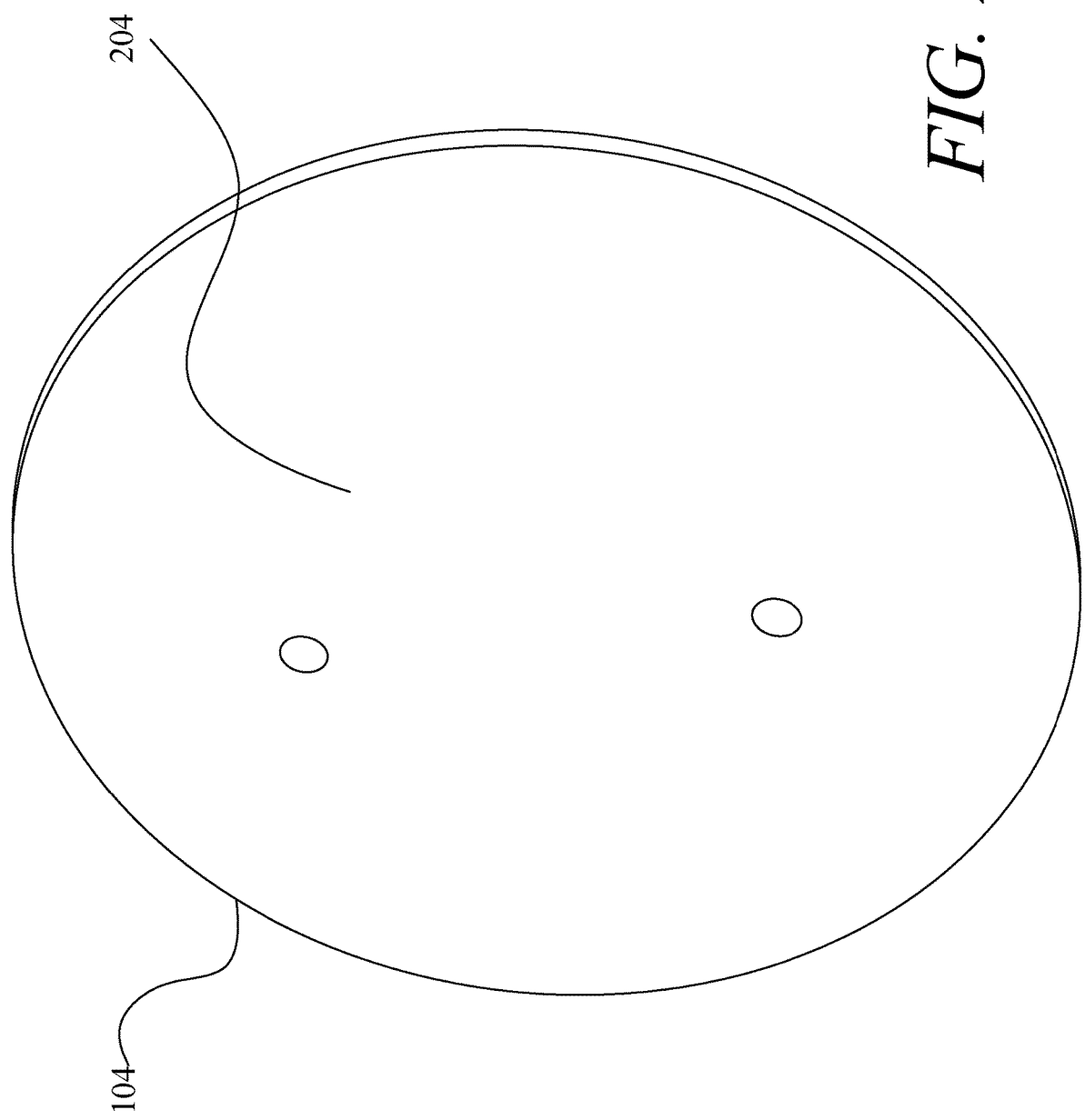
FIG. 2A is a perspective drawing of an exemplary embodiment of a mounting plate.
Figure 2B:
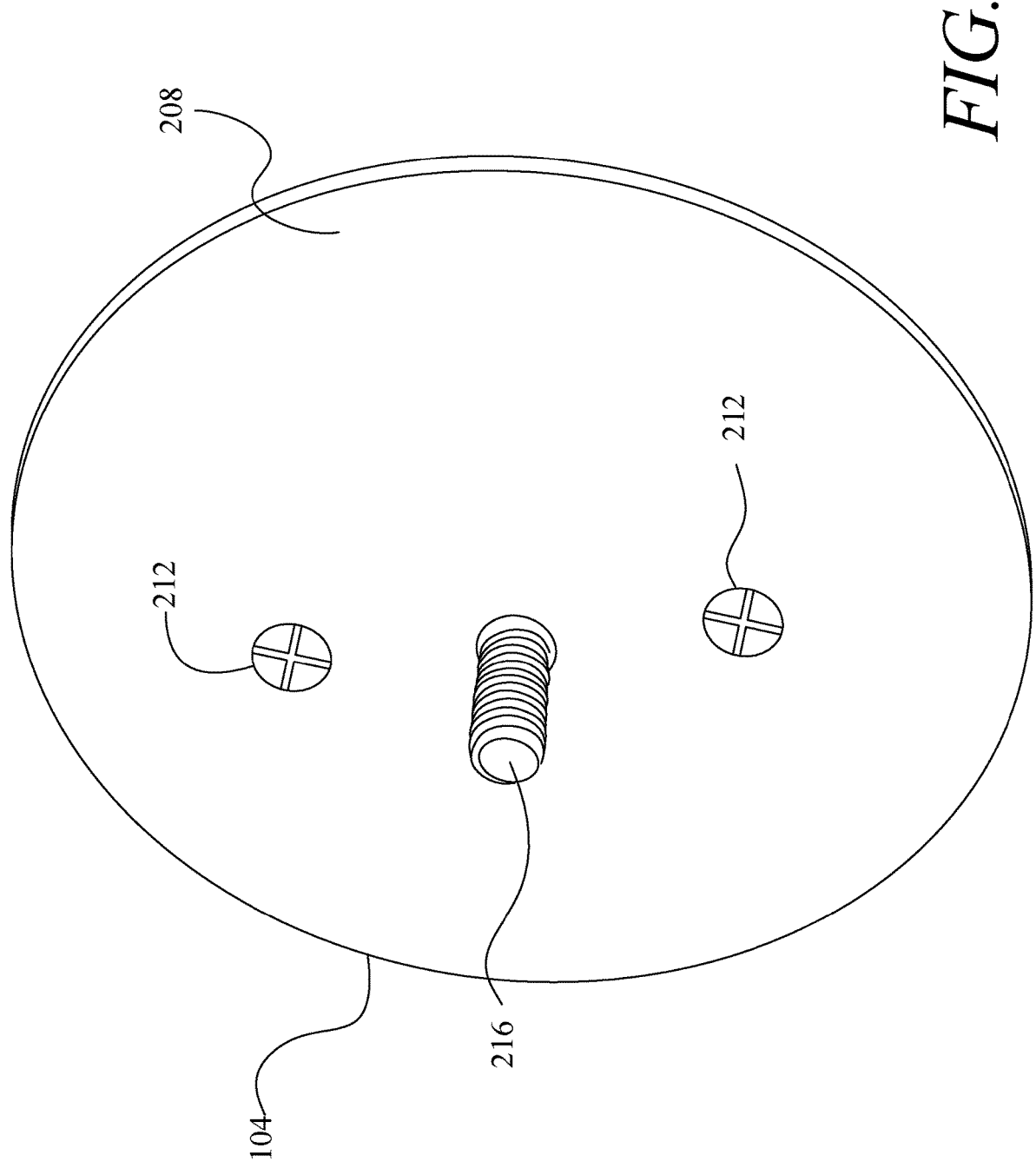
FIG. 2B is a perspective drawing of an exemplary embodiment of a mounting plate.

Referring now to FIG. 2A, an exemplary embodiment of a mounting plate 104 is illustrated. Mounting plate 104 may include a wall-facing surface 204 mounted against the vertical surface 108. As shown in FIG. 2B, mounting plate 104 includes a post-facing surface facing away from the vertical surface 108; post-facing surface may be parallel, or substantially parallel to wall-facing surface 204, forming a slab-like structure. Cross-sectional form of mounting plate 104 may have any suitable shape, including any combination of curved and/or polygonal forms; cross-sectional form may change from wall-facing surface 204 to post-facing surface, or may remain substantially the same. For instance, and without limitation, post-facing surface may be disc-shaped, and/or mounting plate 104 may be disc-shaped.

With continued reference to FIG. 2B, mounting plate 104 may be composed of any suitable material and/or combination of materials, including without limitation metal such as aluminum, titanium, steel, or the like, plant materials including bamboo and/or wood such as balsa wood, birch, oak, or the like, polymer materials such as polycarbonate, polymethyl methacrylate, acrylonitrile butadiene styrene (ABS), or the like, synthetic fibers such as carbon fiber, silicon carbide fiber, metallic fiber, or the like, composite materials such as fiberglass, laminated fiberglass, plywood, or the like, cardboard, or any combination of the above.

Still referring to FIG. 2B, mounting plate 104 may include a first attachment mechanism 212 affixing the mounting plate 104 to the vertical surface 108. First attachment mechanism 212 may include, without limitation, any element usable to attach one rigid component to another, including one or more nails, rivets, studs, anchors such as drywall anchors, or the like. First attachment mechanism 212 may include a threaded fastener. A threaded fastener may include, as a non-limiting example, a screw, nut, and/or bolt. Screws may be composed of materials which may include wood, sheet metal, plastic, stainless steel, brass, nickel, and/or aluminum. Screws may contain tapered shank or non-tapered shank and may include for example, double ended dowel screws, drive screws, drywall screw, eye screw, lag bolt, mirror screw, sheet metal screw, twin fast screw, wood screw, and/or a security head screw. Nuts may include fasteners that contain a threaded hole and bolts may include threaded fasteners that may contain an external male thread. Nuts may be used together in conjunction with a mating bolt to fasten items together. Nuts may utilize various locking mechanisms such as lock washers, jam nuts, lockwire, castellated nuts, and/or nylon inserts. Nuts may be of a certain size and shape, such as a hexagonal shape. Nuts may be composed of materials which may include steel, stainless steel, bronze, metal, wood plastic, brass, nickel, aluminum, and/or nylon. Nuts may include for example, acorn nut, barrel nut, cage nut, coupling nut, cross dowel nut, flange nut, insert nut, knurled nut, split nut, sleeve nut, square nut, swage nut, T-nut, T-slot nut, weld nut, well nut, wing nut, and/or locknuts. Bolts may include heads that can engage with a tool to tighten them. Heads may be of a specific design and shape to fit with certain tools, such as for example a hexagonal shape that can engage with tools such as a wrench or screwdriver. Nuts and bolts may be composed of materials which may include steel, stainless steel, bronze, metal, wood, plastic, brass, nickel, aluminum and/or nylon. Bolts may include for example, anchor bolts, arbor bolts, carriage bolts, elevator bolts, hanger bolts, hex bolts, J bolts, lag bolts, rock bolts, sex bolts, shoulder bolts, and/or U-bolts. First attachment mechanism 212 may be used, without limitation, to attach mounting plate 104 to a structurally strong element of and/or behind vertical surface 108, such as without limitation a wooden and/or metal stud, or other building and/or wall frame element.

Further referring to FIG. 2B, mounting plate 104 includes a second attachment mechanism 216 attached to the post-facing surface. Second attachment mechanism 216 may be attached to post-facing surface by any suitable manner, including welding, adhesion, riveting, engineering fits, or the like. Second attachment mechanism 216 may be manufactured simultaneously with mounting plate 104 and/or post-facing surface, for instance via a machining, molding, casting, additive manufacturing, or other process that forms both mounting plate 104 and second attachment mechanism 216 together. Second attachment mechanism 216 may include without limitation a threaded projection from post-facing surface, such as a bolt projecting from post-facing surface. Second attachment mechanism 216 may alternatively or additionally include a threaded hole, such as a nut integrated in and/or affixed to second attachment mechanism 216, into which a reciprocally threaded bolt may be screwed. Alternatively, second attachment mechanism 216 may include one or more latches and/or portions of latches, such as a mechanism having a biasing means and wedge cam or the like that deforms the mechanism against the biasing means, causing it to snap into a position retaining a reciprocal structure such as a slot or depression into which a projection of mechanism may be inserted under a recoil force imposed by biasing means; alternatively, such a slot or depression may be on second attachment mechanism 216 and a structure as described above on another component may latch to slot or depression. Two structures on different components that latch together maybe referred to as reciprocal latching elements. Persons skilled in the art, upon reviewing the entirety of this disclosure, will be aware of various alternative or additional forms that latches and/or attachment mechanisms may take consistently with this disclosure. Second attachment mechanism 216 may be located at any suitable point and/or points on post-facing surface. For instance, and without limitation, second attachment mechanism 216 may be located at a geometric center of the post-facing surface.

Figure 3:
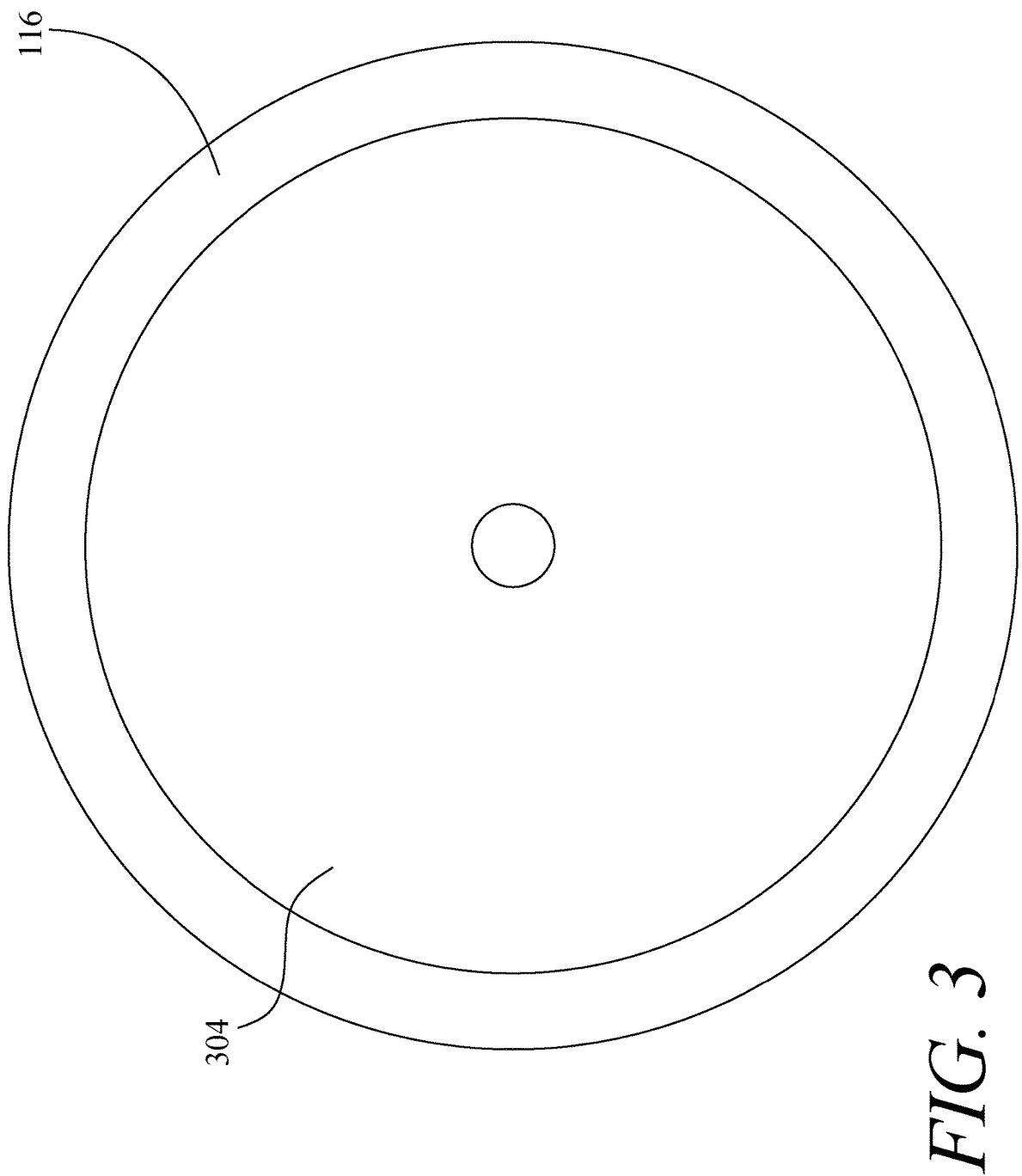
FIG. 3 is a schematic diagram of an exemplary embodiment of a proximal surface.

Referring now to FIG. 3, scratch post 112 includes a proximal end 116. Proximal end 116 attaches to mounting plate 104. Proximal end 116 includes a proximal surface 304 formed to fit against the post-facing surface. Proximal surface 304 may be composed of any material and/or combination of materials suitable for composition of mounting plate 104.

Figure 4:
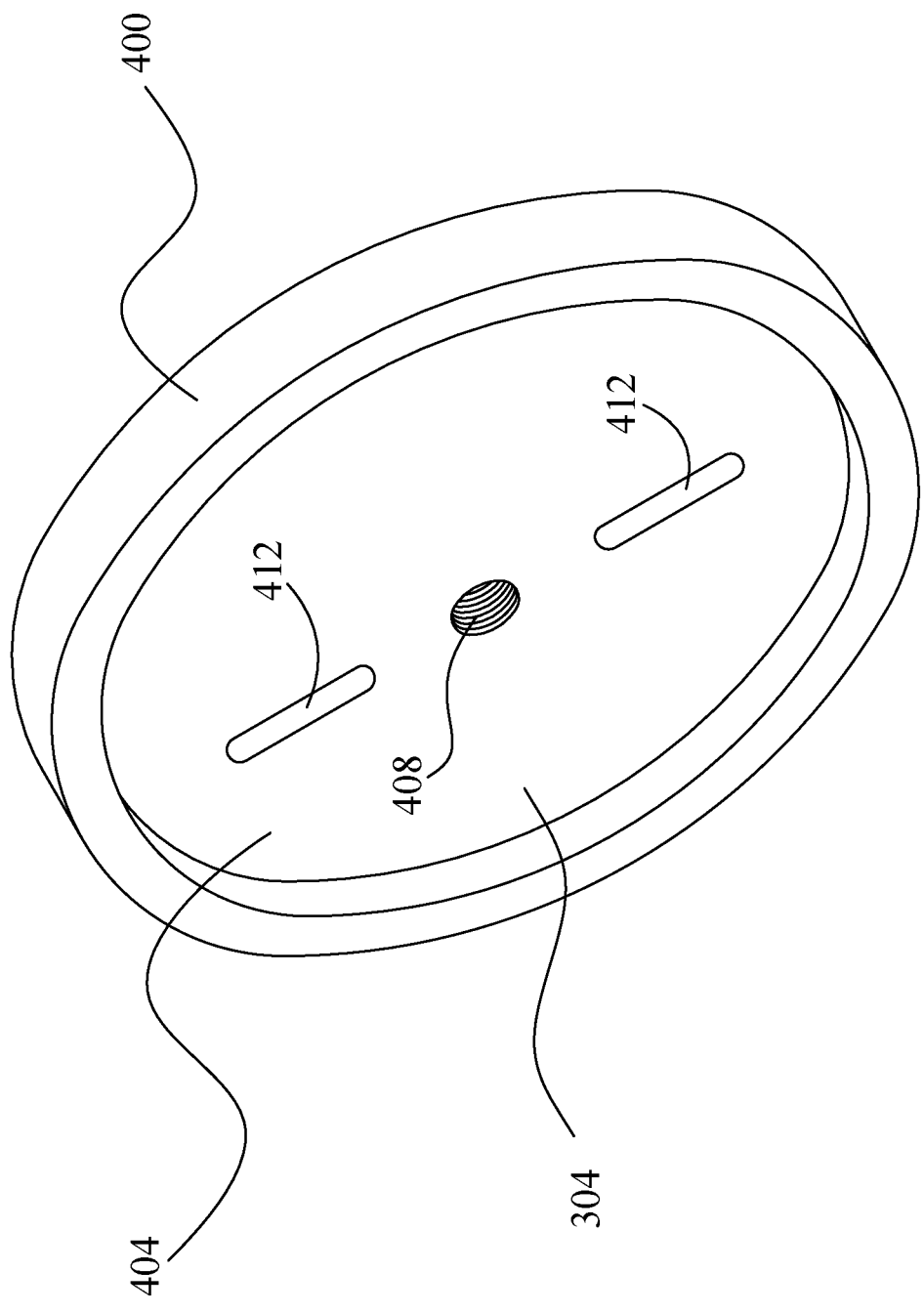
FIG. 4 is a schematic diagram of an exemplary embodiment of a proximal end plate.

Referring now to FIG. 4, proximal end 116 may include a proximal end plate 400, which may be composed of any material and/or combination of materials suitable for composition of mounting plate 104, including without limitation metal, plastic, combinations of metal and plastic, or the like;

proximal end 116 surface may include a surface of the proximal end plate 400. Proximal end plate 400 may be inserted into proximal end 116; for instance, proximal end plate 400 may fit into a hollow portion of proximal end 116, for instance and without limitation such that proximal surface 304 of proximal end plate 400 is flush with proximal end 116. Proximal surface 304 may include a recess 404 that fits around the mounting plate 104. For instance, where mounting plate 104 includes a disc-shape and/or substantially disc-shaped body, proximal surface 304 may include a disc-shaped and/or cylindrical depression and/or recess 404 into which mounting plate 104 fits snugly, such that a recessed portion of proximal surface 304 fits against pole-facing surface 208 upon attachment. In embodiment, mounting plate 104 may fit into recess 404 such that wall-facing surface 204 is flush or nearly flush with non-recessed portions of proximal surface 304 when pole-facing surface 208 is against a recessed portion of proximal surface 304. As a result, scratch post 112 may appear to attach directly to vertical surface 108, with no mounting plate 104 visible, when assembly 100 is fully assembled.

Still referring to FIG. 4, proximal surface 304 may include a third attachment mechanism 408 that attaches to the second attachment mechanism 216; attachment of third attachment mechanism 408 to second attachment mechanism 216 may press proximal surface 304 against pole-facing surface 208, effecting a secure and fixed attachment of scratch post 112 to mounting plate 104, and thus to vertical surface 108. As a non-limiting example, where second attachment mechanism 216 includes a threaded projection from post-facing surface as described above, such as a bolt projecting from post-facing surface, third attachment mechanism 408 may include a reciprocally threaded hole, which may be attached to second attachment mechanism 216 by screwing the hole and/or scratch post 112 onto threaded projection. Where second attachment mechanism 216 includes a threaded hole, such as a nut integrated in and/or affixed to second attachment mechanism 216, third attachment mechanism 408 may include a reciprocally threaded bolt that may be screwed into the hole. Alternatively or additionally, third attachment mechanism 408 may include any latch and/or reciprocal latching element, as described above, that latches with second attachment mechanism 216.

Figure 5:
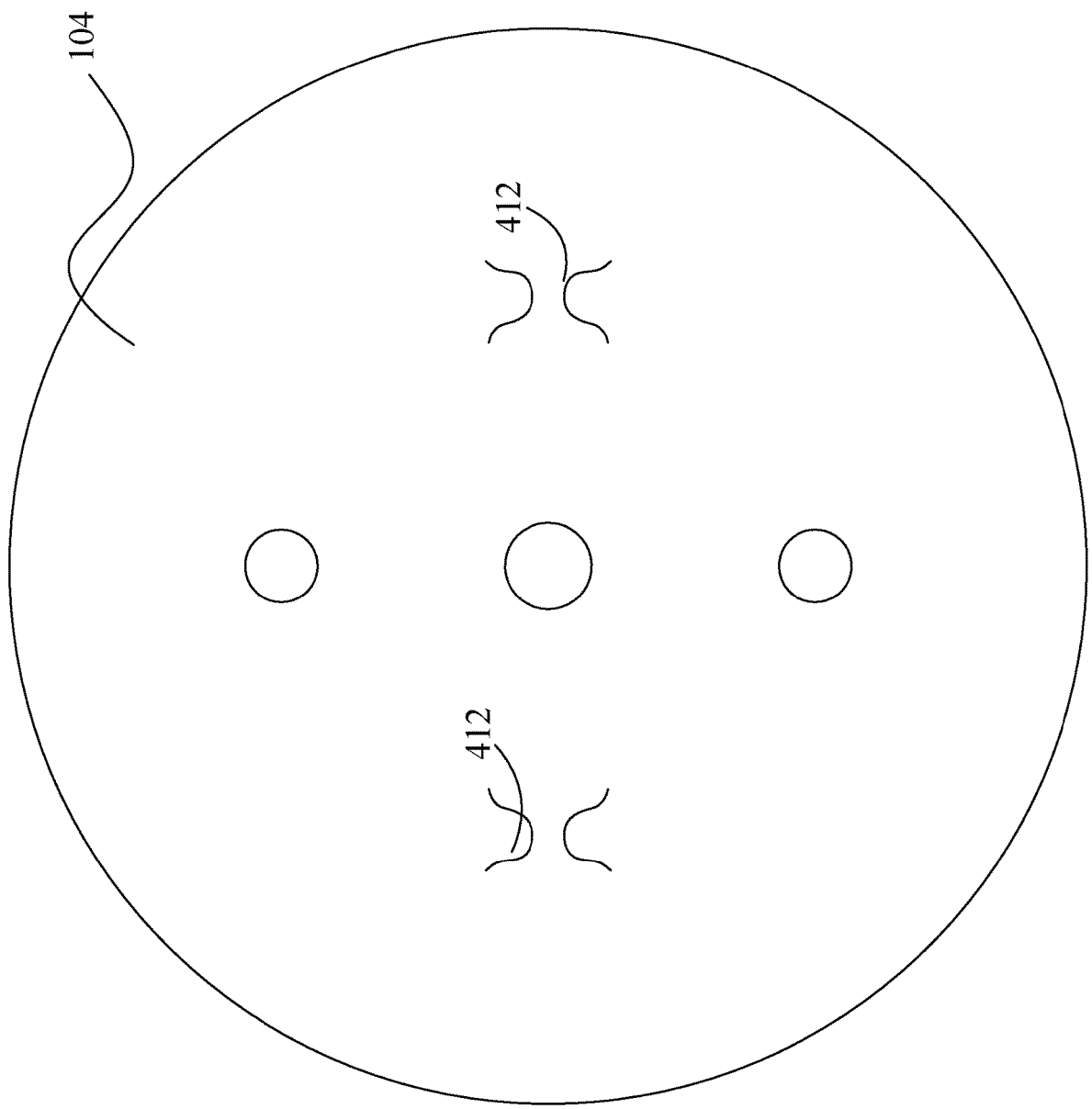
FIG. 5 is a schematic diagram of an exemplary embodiment of a mounting plate.

Still referring to FIG. 4, at least one of proximal surface 304 and post-facing surface may include a retention mechanism 412. Retention mechanism 412 may include any structural element formed to prevent rotation of proximal end 116 surface relative to post-facing surface when proximal end 116 surface is fitted against post-facing surface. For instance, and without limitation, retention mechanism 412 may include one or more surface irregularities that increase static coefficient of friction between surfaces, causing greater resistance to rotation; this may have the effect of preventing accidental loosening and/or detachment of scratching post from mounting plate 104. Projections may have any suitable form, including a form of ridges, depressions, bumps, or the like. FIG. 5 illustrates an exemplary embodiment of mounting plate 104 having a retention mechanism 412 on post-facing surface that may reciprocally engage a retention mechanism 412 on a proximal surface 304, for instance and without limitation as illustrated above in FIG. 4. Alternatively or additionally, retention mechanism may include an adhesive, which may be applied to proximal end surface, post-facing surface, second attachment mechanism, and/or third attachment mechanism. Adhesive may include, without limitation, a thread locker applied to threads of second attachment mechanism and/or third attachment mechanism, where a "thread locker" is an adhesive applied to threads of a threaded attachment mechanism to resist rotation of the attachment mechanism, preventing loosening.

Figure 6:
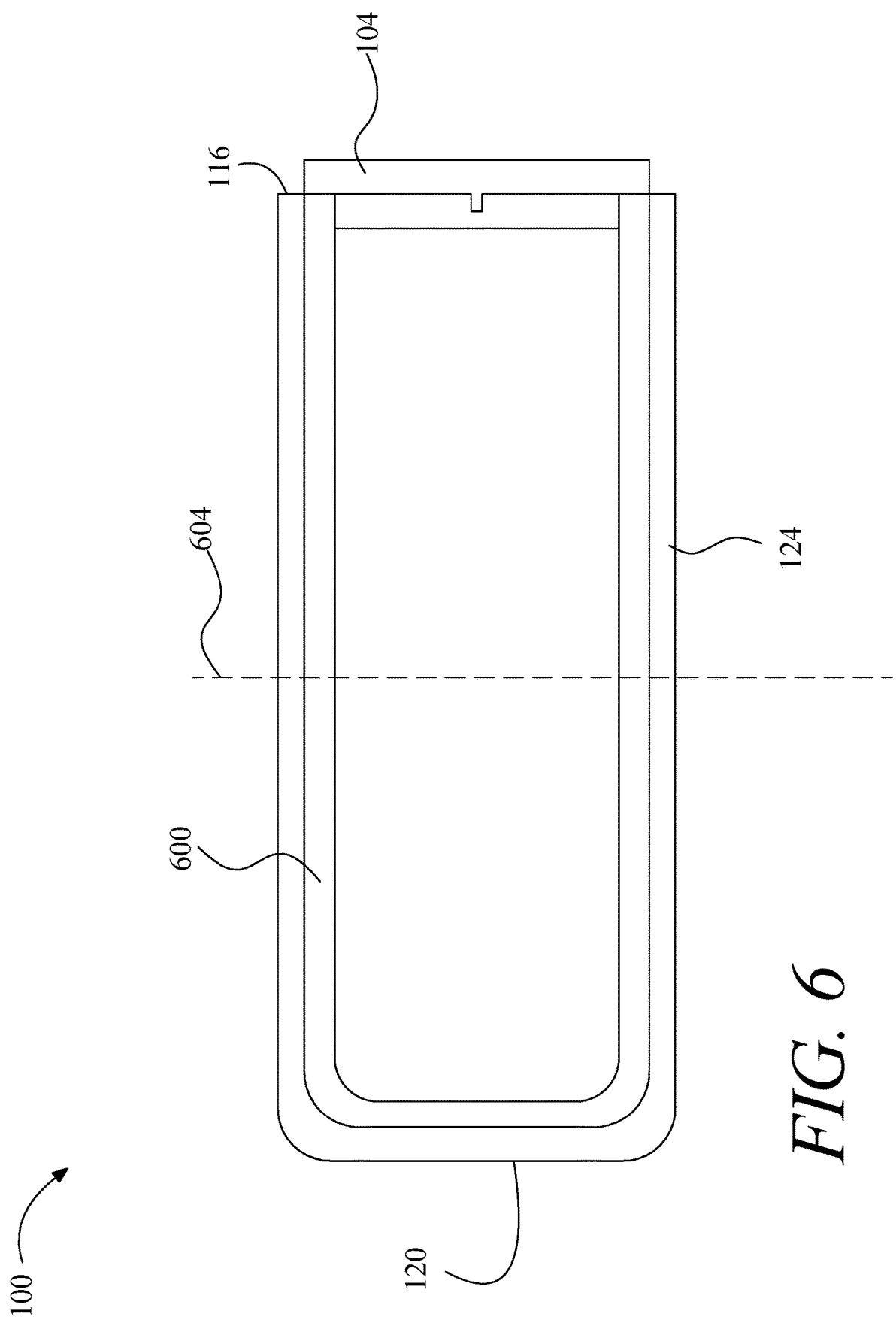
FIG. 6 is longitudinal cross-section of an exemplary embodiment of a wall-mounted scratch post assembly for cats.

Referring now to FIG. 6, a longitudinal cross-sectional view of a non-limiting embodiment of assembly 100 is illustrated. Scratch post 112 includes a support structure 600 connecting proximal end 116 to distal end 120. Support structure 600 may be composed of any material and/or combination of materials suitable for composition of mounting plate 104. Support structure 600 may have any suitable exterior shape; for instance, support structure 600 may be cylindrical and/or substantially cylindrical, and/or may have any curved and/or polyhedral form and/or combination thereof. Interior structure of support structure 600 may be substantially hollow, solid, and/or include a combination of voids and solid structure. For instance, an interior space of support structure 600 may include one or more internal bracing elements, such as triangular bracing made up of sheets or walls of rigid material. Bracing elements and voids may form any suitable configuration, including without limitation honeycomb construction. Support structure may, without limitation, be constructed of a hollow tube with a cap at a distal end of support structure, where distal end is at distal end 120; cap may be constructed of any material suitable for construction of mounting plate and/or proximal end plate In an embodiment, and still referring to FIG. 6, a weight and/or mass of scratch post 112 and/or assembly 100 may be biased to one end or the other, such as without limitation biasing the weight and/or mass of scratch post 112 to proximal end 116. For instance, and without limitation, center of mass of scratch post 112 and/or assembly 100 may be between a center line 604 of scratch post 112 and the proximal end 116, where a "center line 604" is defined as a line contained in a transverse cross-sectional plane equidistant from distal end 120 and proximal end 116. This may be accomplished, without limitation, by constructing structural support to have a tapering density from proximal end 116 to distal end 120, and/or to have an overall density less than that of mounting plate 104 and/or proximal end plate 400, by construction from less dense material and/or inclusion of hollows and/or voids within support structure 600. For instance, and without limitation, mounting plate 104 and/or proximal end plate 400 may be constructed using a first material having a first density, such as steel or other metal, and support structure 600 may constructed using a second material having a second density less than the first density, such as without limitation plastic and/or wood.

Continuing to refer to FIG. 6, fibrous covering 124 may coat support structure 600, for instance and without limitation by covering all or substantially all of an exterior surface of support structure 600. Fibrous coating may include, without limitation, any flexible material or combination of materials, including without limitation sheets of polymer material fibrous elements inserted and/or formed therein such as rubber, sheets of textile material such as canvas, rope and/or twine windings, and/or any combinations thereof in layers and/or other mixtures. For instance, and without limitation, fibrous covering 124 may be constructed of materials including textiles such as without limitation cotton, canvas, acetate, acrylic, cashmere, linen, lycra, metallic, modal, mohair, nylon, polyester, rayon, silk, soy, spandex, elastane, Tencel, viscose, and/or wool. Materials may include sheets of non-textile flexible material including leather, natural or artificial polymers, or the like. Where fibrous coating includes a rope winding, rope may be composed of any natural fibrous material and/or rope such as hemp, Manila hemp, jute, cotton, dogbane, linen, coir, straw, and/or sisal, and/or any artificial material such as nylon, polypropylene, polyesters, polyethylene, aramid fiber, and/or acrylic fiber.

With continued reference to FIG. 6, fibrous covering 124 may be placed upon support structure 600 by any suitable means, including wrapping and/or winding fibrous covering 124 onto support structure 600, adhering fibrous covering 124 to support structure 600 using an adhesive such as without limitation epoxy and/or glue, stitching fibrous covering 124 to itself and/or to support structure 600, stapling, or the like. Persons skilled in the art having the benefit of this disclosure will be aware of various ways in which fibrous covering 124 may be attached to support structure 600.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A wall-mounted scratch post assembly for cats, the assembly comprising:
    a mounting plate affixed to a vertical surface, the mounting plate comprising:
        a wall-facing surface mounted against the vertical surface;
        a post-facing surface facing away from the vertical surface;
        a first attachment mechanism affixing the mounting plate to the vertical surface; and
        a second attachment mechanism attached to the post-facing surface; and
    a scratch post, wherein the scratch post comprises:
        a proximal end attached to the mounting plate, wherein the proximal end includes a proximal surface formed to fit against the post-facing surface and a third attachment mechanism that attaches to the second attachment mechanism, wherein a retention mechanism is disposed on at least one of the proximal surface and the post-facing surface, wherein the retention mechanism is formed to prevent rotation of the proximal surface relative to the post-facing surface when the proximal surface is fitted against the post-facing surface;
        a distal end opposite the proximal end and facing away from the vertical surface;
        a support structure connecting the proximal end to the distal end; and
        a fibrous covering coating the support structure.

2. The assembly of claim 1, where the second attachment mechanism is located at a geometric center of the post-facing surface.

3. The assembly of claim 1, wherein the post-facing surface is disc shaped.

4. The assembly of claim 1, wherein the mounting plate is disc shaped.

5. The assembly of claim 1, wherein the mounting plate is composed at least in part of metal.

6. The assembly of claim 1, wherein the proximal surface includes a recess that fits around the mounting plate.

7. The assembly of claim 1, wherein the second attachment mechanism includes a threaded projection.

8. The assembly of claim 1, wherein the third attachment mechanism includes a reciprocally threaded hole.

9. The assembly of claim 1, wherein the support structure is hollow.

10. The assembly of claim 1, wherein a center of mass of the scratch post is between a center line of the scratch post and the proximal end.

11. The assembly of claim 1, wherein the fibrous covering further includes a sisal rope winding.

12. The assembly of claim 1, wherein the retention mechanism includes an adhesive.

13. The assembly of claim 1, wherein:
    the proximal end includes a proximal end plate; and
    the proximal surface includes a surface of the proximal end plate.

14. The assembly of claim 13, wherein the proximal end plate is composed at least in part of metal.

15. A wall-mounted scratch post assembly for cats, the assembly comprising:
    a mounting plate affixed to a vertical surface, the mounting plate comprising:
        a wall-facing surface mounted against the vertical surface;
        a post-facing surface facing away from the vertical surface;
        a first attachment mechanism affixing the mounting plate to the vertical surface; and
        a threaded projection attached to the post-facing surface; and
    a scratch post, wherein the scratch post comprises:
        a proximal end attached to the mounting plate;
        a distal end opposite the proximal end and facing away from the vertical surface;
        a support structure connecting the proximal end to the distal end;
        a fibrous covering coating the support structure; and
        a proximal end plate at the proximal end, wherein the proximal end plate includes
            a proximal surface formed to fit against the post-facing surface, wherein a retention mechanism is disposed on at least one of the proximal surface and the post-facing surface, wherein the retention mechanism is formed to prevent rotation of the proximal surface relative to the post-facing surface when the proximal surface is fitted against the post-facing surface; and
            a reciprocally threaded hole that attaches to the threaded projection.

16. The assembly of claim 15, wherein the support structure is hollow.

17. The assembly of claim 15, wherein the proximal end plate includes a recess that fits around the mounting plate.

18. The assembly of claim 15, wherein a center of mass of the scratch post is between a center line of the scratch post and the proximal end.

19. The assembly of claim 15, wherein the fibrous covering further includes a sisal rope winding.

20. The assembly of claim 15, wherein the retention mechanism includes an adhesive.

* * * * *